(12) United States Patent
Ohannes Yeghia Ohannes et al.

(10) Patent No.: US 12,006,217 B2
(45) Date of Patent: Jun. 11, 2024

(54) METHOD FOR PRODUCING MICROPOROUS CARBON MATERIAL

(71) Applicant: SKELETON TECHNOLOGIES GMBH, Großröhrsdorf (DE)

(72) Inventors: Markarian Ohannes Yeghia Ohannes, Leipzig (DE); Markus Klose, Leipzig (DE); Daniel Weingarth, Rodgan (DE); Jaan Leis, Vahi (EE)

(73) Assignee: SKELETON TECHNOLOGIES GMBH, Großröhrsdorf (DE)

(*) Notice: Subject to any disclaimer, the term of this patent is extended or adjusted under 35 U.S.C. 154(b) by 0 days.

(21) Appl. No.: 18/552,040

(22) PCT Filed: Mar. 16, 2022

(86) PCT No.: PCT/EP2022/056781
§ 371 (c)(1),
(2) Date: Sep. 22, 2023

(87) PCT Pub. No.: WO2022/200140
PCT Pub. Date: Sep. 29, 2022

(65) Prior Publication Data
US 2024/0092641 A1    Mar. 21, 2024

(30) Foreign Application Priority Data
Mar. 24, 2021   (DE) .......................... 102021107429.0

(51) Int. Cl.
*C01B 32/05* (2017.01)
*B01J 8/18* (2006.01)
*B01J 8/24* (2006.01)

(52) U.S. Cl.
CPC ............. *C01B 32/05* (2017.08); *B01J 8/1809* (2013.01); *B01J 8/24* (2013.01);
(Continued)

(58) Field of Classification Search
CPC .. C01B 32/05; B01J 8/1809; B01J 8/24; B01J 2208/00017; B01J 2208/00539; C01P 2004/03; C01P 2004/51
See application file for complete search history.

(56) References Cited

U.S. PATENT DOCUMENTS

| 7,048,902 B2 | 5/2006 | Gordeev et al. |
| 8,137,650 B2 | 3/2012 | Gogotsi et al. |
| (Continued) | | |

FOREIGN PATENT DOCUMENTS

| WO | 9854111 A1 | 12/1998 |
| WO | 2005118471 A1 | 12/2005 |
| WO | 2017207593 A1 | 12/2017 |

OTHER PUBLICATIONS

Dyjak et al. "Carbide-derived carbon obtained via bromination of titanium carbide: Comparative analysis with chlorination and hydrogen storage studies" Microporous and Mesoporous Materials 273 (2019) 26-34 (Year: 2019).*

(Continued)

*Primary Examiner* — Anthony J Zimmer
*Assistant Examiner* — Syed T Iqbal
(74) *Attorney, Agent, or Firm* — Greer, Burns & Crain, Ltd.

(57) ABSTRACT

Processes for the production of microporous carbon material, for use in electrodes of supercapacitors and secondary batteries, in which particulate metal carbide material is fluidized with a halogen gas at a high temperature in a fluidized bed reactor, the halogen gas is desorbed at a lower temperature of 150° C. to at most 250° C. under vacuum, and then the material is passivated using hydrogen gas and then milled.

13 Claims, 3 Drawing Sheets

(52) U.S. Cl.
CPC ............... *B01J 2208/00017* (2013.01); *B01J 2208/00539* (2013.01); *C01P 2004/03* (2013.01); *C01P 2004/51* (2013.01)

(56) References Cited

U.S. PATENT DOCUMENTS

2009/0117094 A1* 5/2009 Leis ................ C04B 35/52
 424/125
2012/0148473 A1 6/2012 Kramarenko

OTHER PUBLICATIONS

International Preliminary Report on Patentability for corresponding International Patent Application No. PCT/EP2022/056781 dated Mar. 24, 2023; priority document.
S. Osswald, et al., "Structural Evolution of Carbide-Derived Carbons Upon Vaccum Annealing" vol. 50, No. 13, Nov. 1, 2012, pp. 4880-4886, retrieved from https://www.sciencedirect.com/science/article/pii/S0008622312005222/pdfft?md5=bf87e4bbfad6b4202760de80ae6de9a0&pid=1-s2.0-S0008622312005222-main.pdf.
International Search Report for corresponding International Patent Application No. PCT/EP2022/056781 dated Jul. 15, 2023; priority document.

* cited by examiner

METHOD FOR PRODUCING MICROPOROUS CARBON MATERIAL

CROSS-REFERENCES TO RELATED APPLICATIONS

This application is a national phase of International Patent Application No. PCT/EP2022/056781, filed on Mar. 16, 2022, which claims the benefit of German Patent Application No. 10 2021 107 429.0, filed on Mar. 24, 2021, the entire disclosures of which are incorporated herein by way of reference.

FIELD OF THE INVENTION

The invention relates to a method for manufacturing microporous carbon material.

BACKGROUND OF THE INVENTION

The terms for macropores, mesopores and micropores as used herein are based on the classification adopted by IUPAC, according to which macropores have a pore diameter greater than 50 nm, mesopores have a pore diameter between 2 nm and 50 nm, and micropores have a pore diameter of less than 2 nm.

The particle sizes are measured herein by laser diffraction in a liquid medium. Auxiliary materials such as surfactants can be used. The evaluation of the measurement is carried out according to Mie and/or Fraunhofer.

Methods for manufacturing microporous carbon material from metal carbide material are known from, for example, WO 98/54111 A1 and U.S. Pat. No. 8,137,650 B2.

Microporous carbon material is a popular electrode material for applications in the field of batteries and supercapacitors. It has been found that smaller pore sizes in particular are advantageous for high volumetric capacity (farad/cm 3). However, a problem with the usual manufacturing processes is that the pore size increases with increasing synthesis temperature.

A higher temperature during the reaction is advantageous, however, because it allows the reaction to proceed faster and thus increases productivity.

SUMMARY OF THE INVENTION

It is an object of the invention to disclose an improved manufacturing process for microporous carbon material.

The object may be achieved by the subject-matter of one or more embodiments described herein. Preferred further embodiments are also disclosed.

The invention provides a method for manufacturing microporous carbon material, the method comprising the following steps: a) in a fluidized bed reactor, fluidizing a granular metal carbide material by means of a halogen gas or a gas mixture containing a halogen gas at a temperature from 800° C. to 1300° C., both inclusive;
b) maintaining the product obtained in step a) at a temperature from 150° C. to at most 250° C., both inclusive, and under vacuum at a pressure from 1 mbar to 300 mbar, both inclusive; and thereafter or subsequently
c) maintaining under an atmosphere of hydrogen gas or of a gas mixture containing at least 30% by volume of hydrogen based on the total volume of the gas mixture, at a temperature of from 800° C. to 1300° C., both inclusive; and
d) comminuting to a particle size D90 of 10 μm to 30 μm, both inclusive, and a particle size D10 of 1.5 μm to 2 μm, both inclusive.

Preferably, the halogen gas is a gas containing at least one halogen atom. HCl and $Cl_2$ are examples of a halogen gas.

Preferably, in step a), the gas mixture consists of the halogen gas and an inert gas that is inert at the temperatures.

Preferably, in step a) the gas mixture consists of the halogen gas and a reactive gas that is reactive with the metal carbide material at the temperatures.

Preferably, in step a), the gas mixture consists of the halogen gas, an inert gas, and a reactive gas.

Preferably, the inert gas is selected from a group consisting of helium, neon, argon, krypton, and xenon. Preferably, the inert gas is argon.

Preferably, the reactive gas is selected from a group consisting of carbon monoxide, carbon dioxide, and water.

Preferably, the halogen gas is a gas containing at least one halogen atom. HCl and $Cl_2$ are examples of a halogen gas.

Preferably, in step a), the gas mixture consists of the halogen gas and an inert gas that is inert at the temperatures.

Preferably, in step a) the gas mixture consists of the halogen gas and a reactive gas that is reactive with the metal carbide material at the temperatures.

Preferably, in step a), the gas mixture consists of the halogen gas, an inert gas, and a reactive gas.

Preferably, the inert gas is selected from a group consisting of helium, neon, argon, krypton, and xenon. Preferably, the inert gas is argon.

Preferably, the reactive gas is selected from a group consisting of carbon monoxide, carbon dioxide, and water.

Preferably, the metal carbide material has a particle size D90 of from greater than 10 μm to including 500 μm, preferably from including 50 μm to 200 μm, more preferably from 120 μm to 180 μm. The particle size distribution can be monomodal or multimodal, preferably bimodal.

Preferably, in step a), after fluidizing with the halogen gas or gas mixture, fluidizing with a purge gas in the fluidized bed reactor at a temperature of from 800° C. to 1300° C., both inclusive, wherein the purge gas does not react at least with carbon at said temperature.

Preferably, in step a), during fluidization, the temperature is from 900° C. to 1200° C., both inclusive, preferably from 1000° C. to 1100° C., both inclusive, preferably from 950° C. to 1050° C., both inclusive, preferably from 980° C. to 1020° C., both inclusive.

Preferably, the purge gas is selected from a group consisting of helium, neon, argon, krypton and xenon. Preferably, the purge gas is argon.

Preferably, the metal carbide material is selected from a group consisting of ternary carbide material, vanadium carbide material, titanium carbide material, molybdenum carbide material, silicon carbide material, tungsten carbide material, tantalum carbide material, and niobium carbide material. Preferably, the metal carbide material is selected from a group consisting of VC, TiC, MoC, SiC, WC, TaC, and NbC. Preferably, the metal carbide material is silicon carbide material or SiC. Preferably, the halogen gas is chlorine.

Preferably, in step a), the halogen gas is supplied in an amount which is from 100% to 110%, both inclusive, of the stoichiometrically required amount.

Preferably, in step b), the vacuum is from 5 mbar to 200 mbar, both inclusive, of the stoichiometrically required amount.

Preferably, in step b) the vacuum is from 5 mbar to 200 mbar, both inclusive, preferably from 5 mbar to 80 mbar, both inclusive, more preferably from 8 mbar to 15 mbar, both inclusive, more preferably 10 mbar.

Preferably, step a) is carried out for a duration of from 8 hours to 13 hours, both inclusive.

Preferably, step b) is carried out for a duration of from 12 hours to 30 hours, both inclusive.

Preferably, step c) is performed for a duration of from 2 hours to 4 hours, both inclusive.

Preferably, in step a), fluidizing with the halogen gas or gas mixture is performed for a duration of from 9 hours to 13 hours, both inclusive, and fluidizing with the purge gas is performed for a duration of from 1.5 hours to 2.5 hours.

Preferably, in step a), fluidizing with the halogen gas or the gas mixture is carried out for a duration of 2.5 hours to 3.5 hours per kilogram of metal carbide material.

Preferably, step b) is carried out for a duration of from 22 hours to 26 hours, both inclusive.

Preferably, step b) is carried out for a duration of from 22 hours to 26 hours both inclusive.

Preferably, step c) is carried out prior to step d). Preferably, step d) is performed prior to step c). Preferably, step c) is performed before step d) and then step c) is performed again with a lesser duration, preferably with a duration not less than 15 minutes.

Preferably, step b) is carried out using the fluidized bed reactor.

Preferably, step c) is carried out using the fluidized bed reactor or using a tube or rotary kiln.

One idea of the invention is to produce microporous carbon material for application in the energy storage field. In particular, an increase in the amount of carbon material produced is to be achieved, as well as a pore structure which is particularly useful for energy storage applications. The invention follows the basic principle of treating a metal carbide material with a halogen gas and producing microporous carbon material by the reaction. Carbon material of this type is referred to as "carbide-derived-carbon" or CDC for short.

The metal carbide material, for example silicon carbide, is fed into a fluidized bed reactor as a granulate with a particle size of about 150 μm. Preferably, 90 percent of the particles have a size of less than 150 μm, which is known in brief as D90 of 150 μm. Other particle sizes up to about 500 μm are also conceivable in principle. In order to achieve acceptable fluidization of the metal carbide powder in the fluidized bed reactor, the gas flow rate should be adjusted.

During treatment with the halogen gas, for example chlorine, the metal is removed from the metal carbide material and blown out of the reactor as a gaseous metal halide compound due to the high temperature. What remains is a carbon material that has to be treated in further steps in order to finally obtain the properties that are desired for energy storage manufacture. These properties are influenced, among other things, by the size of the polymers, the particle size and functional groups on the carbon surface.

In order to remove excess halogen gas from the reactor and the material, the fluidized bed reactor is preferably purged with an inert gas, such as argon, at a high temperature.

Advantageously, after halogen treatment and purging with inert gas, the material is heated to a moderate temperature of up to about 250° C. under vacuum. In this way, halogen-containing impurities can be removed from the material even more effectively.

The dehalogenated material may still have cut bonds or unsaturated bonds, also known as "dangling bonds". Treating the material with hydrogen gas at a high temperature can saturate the cut bonds, effectively removing them. Thus, the likelihood of undesirable substances accumulating on the carbon material due to the cut bonds can be reduced.

Advantageously, the carbon material is used in the manufacture of energy storage cells, such as supercapacitors and secondary batteries. In particular, the carbon material is used in at least one of the electrodes of the cells. For this purpose, it is advantageous to be able to produce a fine suspension or slurry with the carbon material, also known as "slurry". The particle size also allows the production of so-called dry electrodes. The carbon material can be comminuted before or after treatment with hydrogen gas, for example in a mill such as a ball mill or jet mill.

Particle sizes D90 of 10 μm to 30 μm have proven particularly useful in practice. Preferably, the particles should have a particle size D10 of more than 1.5 μm to 2 μm.

Overall, the ideas described herein can be used to produce a microporous carbon material suitable for use in the manufacture of supercapacitors and secondary batteries. The microporous carbon material disclosed herein has all three types of pores, i.e., micropores, mesopores and macropores.

BRIEF DESCRIPTION OF THE DRAWINGS

Examples of embodiments are explained in more detail with reference to the accompanying schematic drawings. Therein.

DETAILED DESCRIPTION OF THE PREFERRED EMBODIMENTS

Figure 1:
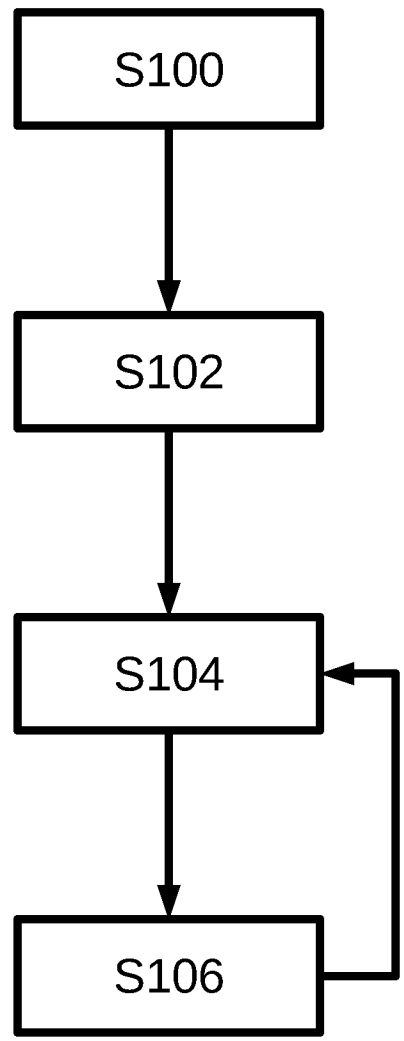
FIG. 1 depicts a schematic flow diagram of the manufacturing process.

Reference is made in the following to FIG. 1, which shows an embodiment of a method for manufacturing microporous carbon material.

The method comprises a treatment step S100. In the treatment step S100, particulate metal carbide material, for example silicon carbide, is initially fed into a fluidized bed reactor. The reactor and thus the metal carbide material are heated to a temperature of about 1000° C. Lower temperatures from 800° C. are also conceivable. The heating process preferably takes between 1 hour and 1.5 hours.

Then the metal carbide material is fluidized by means of a halogen gas, preferably chlorine gas. The volumetric flow rate of the chlorine gas is adjusted so that about 100 percent to 110 percent of the stoichiometrically required amount of chlorine gas flows through the fluidized bed reactor.

Fluidization at high temperature is carried out for a period of about 2.5 hours to 3.5 hours per kilogram of metal carbide material in the fluidized bed reactor.

After completion of the halogen treatment, the fluidized bed reactor is fluidized with a purge gas at a constant high temperature. The purge gas is such that it does not react with the carbon even at the high temperatures of 1000° C. The preferred purge gas is, for example, argon. The purge gas may also be a mixture of multiple substances.

The method further comprises a desorption step S102. In the desorption step, the product obtained from the previous step is removed from the fluidized bed reactor and kept at a temperature of preferably 195° C. to 205° C. under a rough vacuum of about 10 mbar. During this process, excess halogen gas escapes from the material. The halogen gas dissolving from the material can visibly set the powdered material in motion.

Preferably, the desorption step S102 is carried out at least until the visible movement of the material comes to a standstill. A small safety period of about 15 min to 30 min can still be provided for the desorption step S102 by which the step is carried out longer. The desorption step can also be carried out without separate monitoring. In this case, the desorption step S102 is carried out for, for example, 12 hours to 24 hours.

The method further comprises a passivation step S104 and a grinding step S106. These steps are performed after the treatment step S100 and the desorption step S102.

For the passivation step S104, the material obtained from the previous steps is charged into a rotary kiln or into a fluidized bed reactor. The material is heated to a temperature of about 1000° C. and brought into contact with hydrogen gas or a gas mixture containing at least 50 percent by volume of hydrogen based on the total volume of the gas mixture. In the case of the fluidized bed reactor, the material is fluidized with the hydrogen gas or the gas mixture.

The duration of the passivation step is preferably based on the total dissolved solids (TDS) value of the passivated material. To determine the TDS value, the carbon is boiled in distilled water for 10 min and the filtered-off water is measured at 25° C. using a conductivity probe. The passivation step S104 is carried out at least until the TDS value reaches or falls below 50 µS/cm. This is because in this case the risk of damage to the electrodes due to corrosion by the slurry increases. The passivation step S104 is preferably carried out until the TDS value is between 2.5 µS/cm and 50 µS/cm, preferably up to 10 µS/cm, more preferably up to 5 µS/cm.

Then, in comminution step S106, the passivated material is comminuted to a particle size D90 of inclusive 10 µm to inclusive 15 µm and a particle size D10 of more than 1.5 lam to 2 µm. These particle sizes allow the formation of a slurry which is particularly suitable for further processing for the production of supercapacitors and secondary batteries or their electrodes.

The comminution step S106 can be carried out before or after the passivation step S104. If the comminution step S106 is performed after the passivation step S104, it is advantageous to perform the passivation step S104 again, but for a shorter duration than the first pass.

Example 1: Carbon Material Made from SiC

Figure 2:
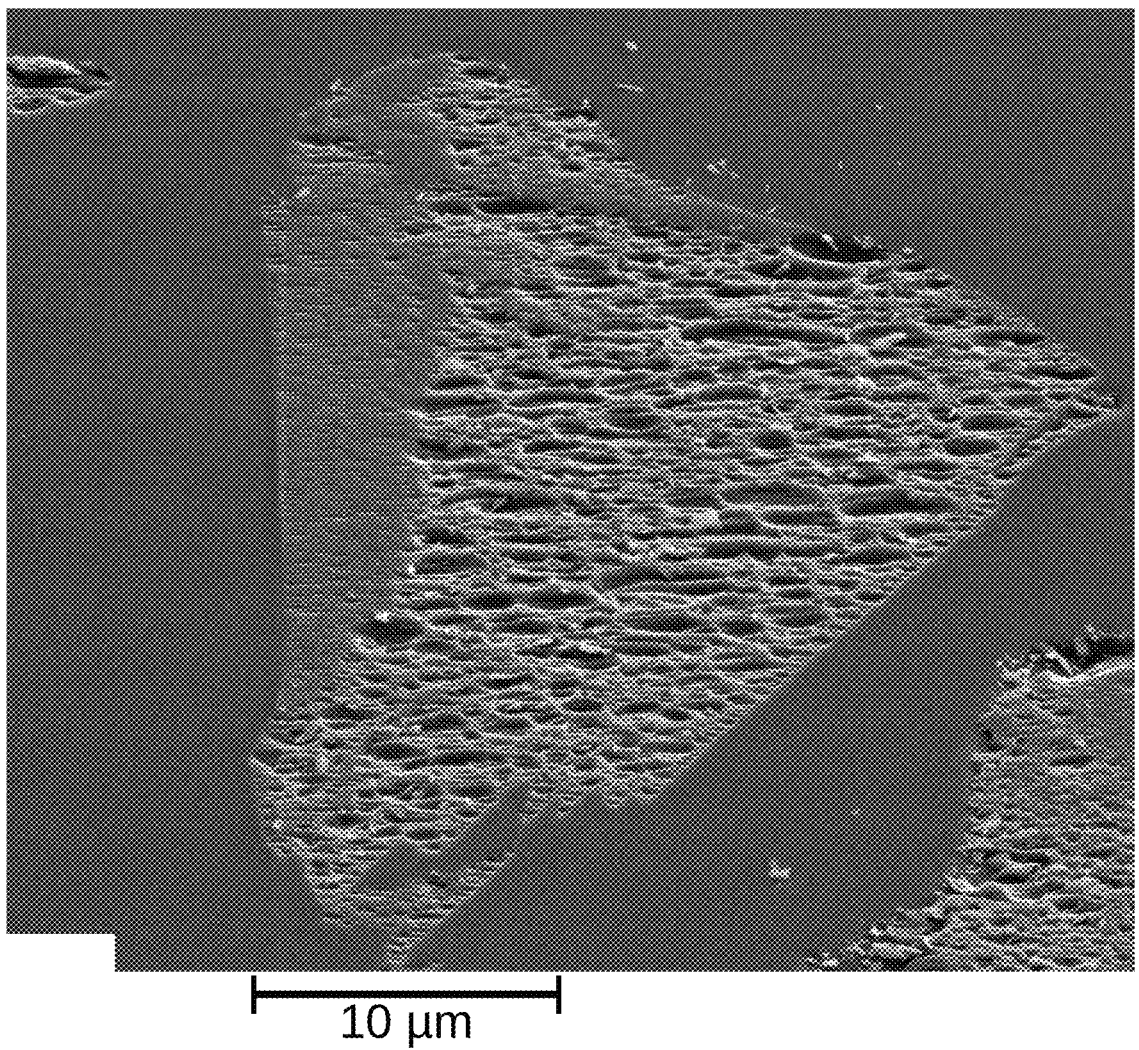
FIG. 2 depicts a scanning electron micrograph of a particle cross-section after synthesis and before size reduction.
Figure 3:
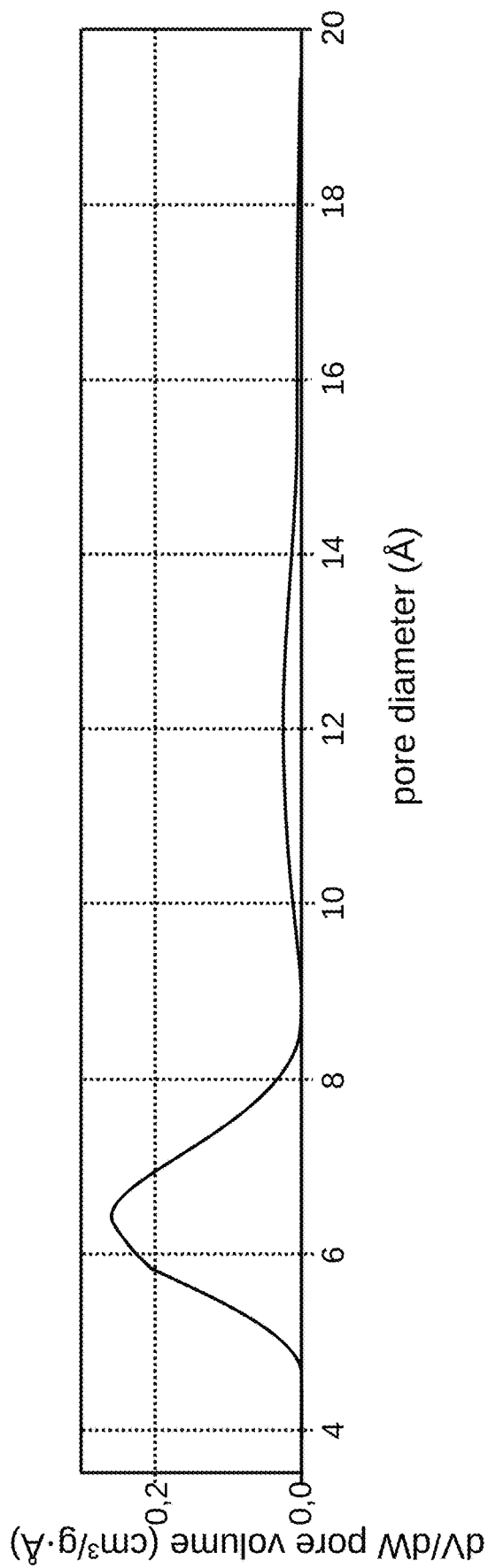
FIG. 3 depicts a diagram of the pore size distribution of the material.

Reference is made in the following to FIGS. 2 and 3, which show characteristic features of the microporous carbon material obtained by the previously explained method based on SiC.

FIG. 2 shows a scanning electron microscope image of a section through a single particle prepared according to the present invention. There are clearly macropores present in the material.

As can be seen from FIG. 3, the carbon material has a high number of pores with a pore diameter between 5 angstroms (Å) and 9 Å. The most common pore size is about 6.5 Å.

In addition to these micropores, the material also has micropores with a pore diameter of more than 9 Å to almost 20 Å. The most common in this range is a pore diameter of about 11.5 Å to 12.5 Å. It has been shown that such a pore distribution, including the macropores, is particularly suitable for the fabrication of supercapacitors and secondary batteries.

The porosity was determined by nitrogen physisorption in conjunction with the Brunauer-Emmet-Teller (BET) and Rouquerol evaluation methods as described in the IUPAC Technical Report: "Physisorption of gases, with special reference to the evaluation of surface area and pore size distribution (IUPAC Technical Re-port)" by Thommes et al, Pure Appl. Chem. Chem. 2015; 87(9-10): 1051-1069. This disclosure is specifically incorporated herein by reference. The total pore volume was determined using BET, while the micropore volume was determined using density functional theory (DFT). Since not all assumptions of the BET method may be met for microporous materials, the surface areas determined from the BET method and the DFT method may appear contradictory. A look at the pore size distribution allows the correct estimation of the ratio of the surfaces to each other, i.e. how much surface area of the carbon material is due to micropores.

The microporous carbon material produced from SiC using the method presented here had a surface area of about 1290 $m^2/g$ and a total pore volume of 0.6 $cm^3/g$. The total pore volume is determined at a relative pressure of 0.95 according to IUPAC. Here, the micropore volume accounts for about 0.5 $cm^3/g$ and the micropore surface area is about 1334 $m^2/g$. Considering the pore size distribution in FIG. 3, it can be concluded that almost the entire surface area is due to micropores, with the majority of the micropores again having diameters of 5 Å and 9 Å.

In addition, the microporous carbon material produced by this method has an ash content of less than 1% by weight based on the total mass of the microporous carbon material. The skeletal density is about 2.277 $g/cm^3$ to 2.451 $g/cm^3$. The skeletal density was determined by helium pycnometry at constant volume (Used gas pycnometer AccuPyc II from Micromeritics).

Using standard spectroscopy techniques, the carbon material was shown to contain graphitic and also amorphous structures (Ramanspectroscopy), as well as being free of oxygen-containing groups on the surface (IR spectroscopy).

Example 2: Carbon Material Made from TiC

The method as previously described is performed with TiC as tha carbide material. The pore size distribution is similar to SiC, but the primary peak is at 8.5 Å. The carbon material has a surface area of about 1681 $m^2/g$ and a total pore volume of 0.8 $cm^3/g$. Of this, the micropore volume accounts for 0.6 $cm^3/g$ and the micropore surface area is about 1448 $m^2/g$.

Comparative Example: Commercially Available Activated Carbon

Commercially available activated carbon is available, for example, under the trade name YP-50F from Kuraray. The primary peak of the pore size is at 8 Å. The carbon has a surface area of about 1707 $m^2/g$ and a total pore volume of 0.9 $cm^3/g$. The micropore volume accounts for 0.6 $cm^3/g$ and the micropore surface area is 1289 $m^2/g$.

In order to improve the production of microporous carbon material, especially for use in electrodes of supercapacitors and secondary batteries, a method is proposed in which particulate metal carbide material is fluidized with a halogen gas at a high temperature in a fluidized bed reactor, the halogen gas is desorbed at a lower temperature of 150° C. to at most 250° C. under vacuum, and then the material is passivated using hydrogen gas and then milled.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing microporous carbon material, the method comprising the steps of:
   a) in a fluidized bed reactor, fluidizing a granular metal carbide material with a halogen gas or a gas mixture containing a halogen gas at a temperature of including 800° C. up to and including 1300° C.;
   b) maintaining a product obtained from step a) at a temperature of including 150° C. to at most 250° C. and under vacuum at a pressure of including 1 mbar to including 300 mbar; and thereafter or subsequently
   c) maintaining the product under an atmosphere of a hydrogen gas or a gas mixture containing at least 30% by volume of hydrogen based on a total volume of the gas mixture at a temperature of including 800° C. up to and including 1300° C.; and
   d) comminuting the product to a D90 particle size of including 10 μm to including 30 μm and a D10 particle size of including 1.5 μm to 2 μm.

2. The method of claim 1, wherein step a) comprises, after fluidizing with the halogen gas or gas mixture, fluidizing with a purge gas in the fluidized bed reactor at a temperature of including 800° C. to including 1300° C., wherein the purge gas does not react with at least carbon at said temperature.

3. The method of claim 2, wherein the purge gas is selected from a group consisting of: helium, neon, argon, krypton, and xenon.

4. The method of claim 2, wherein the purge gas is argon.

5. The method of claim 1, wherein the granular metal carbide material is selected from a group consisting of: vanadium carbide material, titanium carbide material, molybdenum carbide material, silicon carbide material, tungsten carbide material, tantalum carbide material, and niobium carbide material.

6. The method of claim 1, wherein the granular metal carbide material is silicon carbide material and wherein the halogen gas is chlorine.

7. The method of claim 1, wherein in step a) the halogen gas is supplied in an amount which is from both including 100% to including 110% of the stoichiometrically required amount.

8. The method according to claim 1, wherein in step b) the pressure is from including 5 mbar to including 200 mbar, or from including 5 mbar to including 80 mbar, or preferably from including 8 mbar to 15 mbar.

9. The method according to claim 1, wherein:
   step a) is carried out for a duration of from including 8 hours to including 13 hours;
   step b) is performed for a duration of from including 12 hours to including 30 hours; and
   step c) is performed for a duration of from including 2 hours to including 4 hours.

10. The method of claim 9, wherein:
    in step a) fluidizing with halogen gas is performed for a duration of including 9 hours up to and including 11 hours, and fluidizing with a purge gas is performed for a duration of 1.5 hours up to 2.5 hours; and
    step b) is carried out for a duration of from including 22 hours to including 26 hours.

11. The method according to claim 1, wherein step c) is carried out before step d), or wherein step d) is carried out before step c), or wherein step c) is carried out before step d) and then step c) is carried out again for a shorter duration.

12. The method according to claim 1, wherein step b) is carried out using the fluidized bed reactor.

13. The method according to claim 1, wherein step c) is carried out using the fluidized bed reactor or using a rotary kiln.

* * * * *